UNITED STATES PATENT OFFICE 2,511,547

PREPARATION OF 4-CHLORO-3-NITRO-BENZENE SULFONYL CHLORIDE

George W. Seymour and Victor S. Salvin, Cumberland, and Wilford Donald Jones, Cresaptown, Md., assignors to Celanese Corporation of America, a corporation of Delaware No Drawing. Application February 15, 1946, Serial No. 648,006

4 Claims. (Cl. 260—543)

This invention relates to an improved process for the production of 4-chloro-3-nitro-benzene sulfonyl chloride, which compound is a valuable intermediate in the preparation of certain diphenylamine dyestuffs.

An object of this invention is the provision of an improved process for the production of 4-chloro-3-nitro-benzene sulfonyl chloride whereby said intermediate is obtained in greater yield and of a higher degree of purity.

Other objects of this invention will appear from the following detailed description.

The intermediate, 4-chloro-3-nitro-benzene sulfonyl chloride, has previously been prepared by a two-step process involving the sulfonation of ortho-chloro-nitrobenzene followed by reaction of the sulfonic acid formed with phosphorous pentachloride. The 4-chloro-3-nitro-benzene sulfonyl chloride is produced in an impure form by this process and requires purification before it is of a sufficient degree of purity to be employed satisfactorily in the production of dyestuffs which of course, renders the process quite uneconomical.

We have found that 4-chloro-3-nitro-benzene sulfonyl chloride may now be obtained in greater yield and of a higher degree of purity than heretofore attained by an improved process involving the direct chlorsulfonation of ortho-chloronitro-benzene. In accordance with the novel process of our invention, we react about one mol of ortho-chloro-nitrobenzene with from about 2 to 6 mols of chlorsulfonic acid, with agitation, employing a reaction temperature of from 100 to 130° C. The reaction is continued for from 5 to 10 hours, or until the evolution of hydrogen chloride is substantially completed. The 4-chloro-3-nitro-benzene sulfonyl chloride formed by this process is then recovered from the reaction mass by adding the latter to a slurry of crushed ice and water. The product separates out in the form of fine, waxy granules which are filtered from the solution remaining. The filtered granules are sludged with ice-water, neutralized with sodium bicarbonate, filtered once more and then given a final wash with ice-water. Yields of over 90% of theoretical of 4-chloro-3-nitrobenzene sulfonyl chloride of a high degree of purity are obtained by our process.

Both the mol ratio of the reactants and the temperature of reaction are important in achieving the maximum yield. Optimum results are achieved when about four to five mols of chlorsulfonic acid are employed for each mol of ortho-chloro-nitrobenzene present during the chlorsulfonation reaction. Preferably, the reaction is initiated by heating the reaction mixture gradually to a temperature of about 100° C. The start of the chlorsulfonation reaction is indicated by the evolution of hydrogen chloride. The temperature of the reaction mixture is maintained at 100° C. for about one hour, raised to 110° C. for one hour and then to 120° C., being held at the latter temperature for another hour. The evolution of hydrogen chloride is nearly completed by this time. The temperature of the reaction mixture is then raised to a final temperature of about 130° C. and held at this temperature for about three hours longer to complete the reaction. The temperature should not be higher than about 135° C. during the chlorsulfonation reaction since higher temperatures, say, 140 to 145° C., cause some decomposition with the production of a highly colored product.

In order further to illustrate our invention but without being limited thereto the following example is given:

Example 200 parts by weight of ortho-chloro-nitrobenzene (1.25 mol weights) are added to 656 parts by weight of 90.5% chlorosulfonic acid (5 mol weights) in a vessel equipped with a stirrer. The mixture is heated to 100° C. while stirring, and a considerable evolution of hydrogen chloride begins. The temperature is maintained at 100° C. for one hour, then raised to 110° C. where it is held for one hour, and then raised to 120° C., at which temperature it is maintained for another hour. At this point the evolution of hydrogen chloride is nearly complete. The reaction is continued for three hours longer after being raised to a temperature of 130° C. to render the chlorsulfonation reaction substantially complete. The reaction mass is then slowly added to a slurry of crushed ice and water and the 4-chloro-3-nitrobenzene sulfonyl chloride present separates out in the form of fine, waxy granules. Additional ice is added continuously as the ice which is present melts to avoid a temperature rise high enough to cause the product to melt and to separate out as an oil. Too high a temperature favors hydrolysis of the sulfonyl chloride to the corresponding sulfonic acid which, obviously, is quite undesirable since it substantially decreases the yield. The granules are filtered from the liquid, resludged with ice-water, neutralized with sodium bicarbonate, filtered out, washed with ice-water and dried. 286 parts by weight of crude, dry 4-chloro-3-nitrobenzene sulfonyl chloride having a melting point of 50° C. are obtained. This is equivalent to a yield of 88% of theoretical. When purified, the product has a melting point of about 61° C. The product may, however, be employed directly without any purification.

It is to be understood that the foregoing detailed description is given merely by way of illustration and that many variations may be made therein without departing from the spirit of our invention.

Having described our invention, what we desire to secure by Letters Patent is:

1. Process for the production of 4-chloro-3-nitro-benzene sulfonyl chloride, which comprises reacting ortho-chloro-nitrobenzene with chlorsulfonic acid, in ratio of about one mol of ortho-chloro-nitrobenzene to about 2 to 6 mols of chlorsulfonic acid, at a temperature of from about 100 to 130° C. by initiating the reaction at a temperature of about 100° C., increasing the temperature stepwise and completing the reaction at a temperature of about 130° C.

2. Process for the production of 4-chloro-3-nitrobenzene sulfonyl chloride, which comprises reacting ortho-chloro-nitrobenzene with chlorsulfonic acid, in ratio of about one mol of ortho-chloro-nitrobenzene to about 2 to 6 mols of chlorsulfonic acid, at a temperature of about 100° C. for about one hour, raising the temperature to 110° C. for about one hour and then to 120° C. for about one hour, and completing the reaction by heating the reaction mixture for about 3 hours more at 130° C.

3. Process for the production of 4-chloro-3-nitrobenzene sulfonyl chloride, which comprises reacting a ratio of one mol of ortho-chloro-nitrobenzene with 4 to 5 mols of chlorsulfonic acid at a temperature of about 100° C. for about one hour, raising the temperature to 110° C. for about one hour and then to 120° C. for about one hour, heating the reaction mixture for about three hours more at 130° C., adding the reaction mixture to a slurry of ice and water, and filtering the solidified product therefrom.

4. Process for the production of 4-chloro-3-nitrobenzene sulfonyl chloride, which comprises reacting a ratio of one mol of ortho-chloro-nitrobenzene with 4 to 5 mols of chlorsulfonic acid at a temperature of about 100° C. for about one hour, raising the temperature to 110° C. for about one hour and then to 120° C. for about one hour, heating the reaction mixture for about three hours more at 130° C., adding the reaction mixture to a slurry of ice and water, filtering the solidified product therefrom, washing with ice-water, neutralizing the solidified 4-chloro-3-nitro-benzene sulfonyl chloride, washing with ice-water again and drying.

GEORGE W. SEYMOUR.
VICTOR S. SALVIN.
WILFORD DONALD JONES.

REFERENCES CITED

The following references are of record in the file of this patent:

UNITED STATES PATENTS

| Number | Name | Date |
| --- | --- | --- |
| 578,839 | Seifert | Mar. 16, 1897 |
| 1,763,556 | Herz | June 10, 1930 |
| 2,358,465 | McNally et al. | Sept. 19, 1944 |

FOREIGN PATENTS

| Number | Country | Date |
| --- | --- | --- |
| 89,997 | Germany | Nov. 24, 1896 |

OTHER REFERENCES

Pollak et al., "Monatschefte fur Chemie," vol. 55, p. 371 (1930).

Fieser and Fieser, "Organic Chemistry," Heath and Co., Boston, Mass., 1944, pp. 557-561.